United States Patent [19]
Maesano et al.

[11] Patent Number: 5,504,851
[45] Date of Patent: Apr. 2, 1996

[54] PROCESS AND TOOL FOR CONCEPTUAL MODELING OF EXPERTISE ON A COMPUTER SYSTEM

[75] Inventors: Libéro Maesano; Eric Rabaux, both of Paris; Jean-Baptiste Marquet, St Mitre les Remparts, all of France

[73] Assignee: Bull S.A., Puteaux, France

[21] Appl. No.: 98,402

[22] PCT Filed: Dec. 2, 1992

[86] PCT No.: PCT/FR92/01129

§ 371 Date: Oct. 13, 1993

§ 102(e) Date: Oct. 13, 1993

[87] PCT Pub. No.: WO93/11497

PCT Pub. Date: Jun. 10, 1993

[30] Foreign Application Priority Data

Dec. 6, 1991 [FR] France ................................. 91 15177

[51] Int. Cl.⁶ ........................................................ G06F 3/14
[52] U.S. Cl. .............................. 395/157; 395/155; 395/75
[58] Field of Search .................................. 395/12, 50, 54, 395/60, 75, 76, 77, 906, 155, 161, 156, 157, 159, 160; 364/188

[56] References Cited

U.S. PATENT DOCUMENTS

| | | | |
|---|---|---|---|
| 4,752,889 | 6/1988 | Rappaport et al. | 395/12 |
| 4,930,071 | 5/1990 | Tou et al. | 395/54 X |
| 4,964,063 | 10/1990 | Esch | 395/12 X |
| 5,058,033 | 10/1991 | Bonissone et al. | 395/61 |
| 5,195,178 | 3/1993 | Krieger et al. | 395/157 |
| 5,261,037 | 11/1993 | Tse et al. | 395/12 X |
| 5,276,791 | 1/1994 | Palmer | 395/155 X |
| 5,295,230 | 3/1994 | Kung | 395/12 X |
| 5,333,237 | 7/1994 | Stefanopoulos et al. | 395/12 |

FOREIGN PATENT DOCUMENTS 2607284  5/1988  France .

OTHER PUBLICATIONS

"Jet Engine Technical Advisor" (JETA), Abu–Hakima, et al, vol. 2, Jun. 9, 1989, Tullahoma, Tenn., USA, pp. 154–160.
"IEEE Software", Cherubini, et al., vol. 6, No. 6, Nov. 1989, Los Alamitos, USA, pp. 44–52.
"IEEE Conference Proceedings," Tools for Artificial Intelligence 90, Mylopoulos, et al, Nov. 9, 1990, Herndon, Va., USA, pp. 864–870.

Primary Examiner—Raymond J. Bayerl
Assistant Examiner—Crescelle N. dela Torre
Attorney, Agent, or Firm—Weingarten, Schurgin, Gagnebin & Hayes

[57] ABSTRACT

A process for conceptually modeling expertise on a computer system with a central processing unit, a central memory and a display working in multi-windows graphics mode. Each window is equipped with a system of local coordinates and a means of pointing in a window to at least one active zone capable of reacting to at least one unit of information made up of an outside event. The active zone is associated with a group of initial functions called editors, which have at least a second reaction function, and with activation, combining at least one window with a predefined number of conceptual objects composing a body of knowledge organized on four layers of modeling of expertise. Each window takes into account connections between the different conceptual objects, updating or changing a conceptual object and automatically updating the connections.

6 Claims, 12 Drawing Sheets

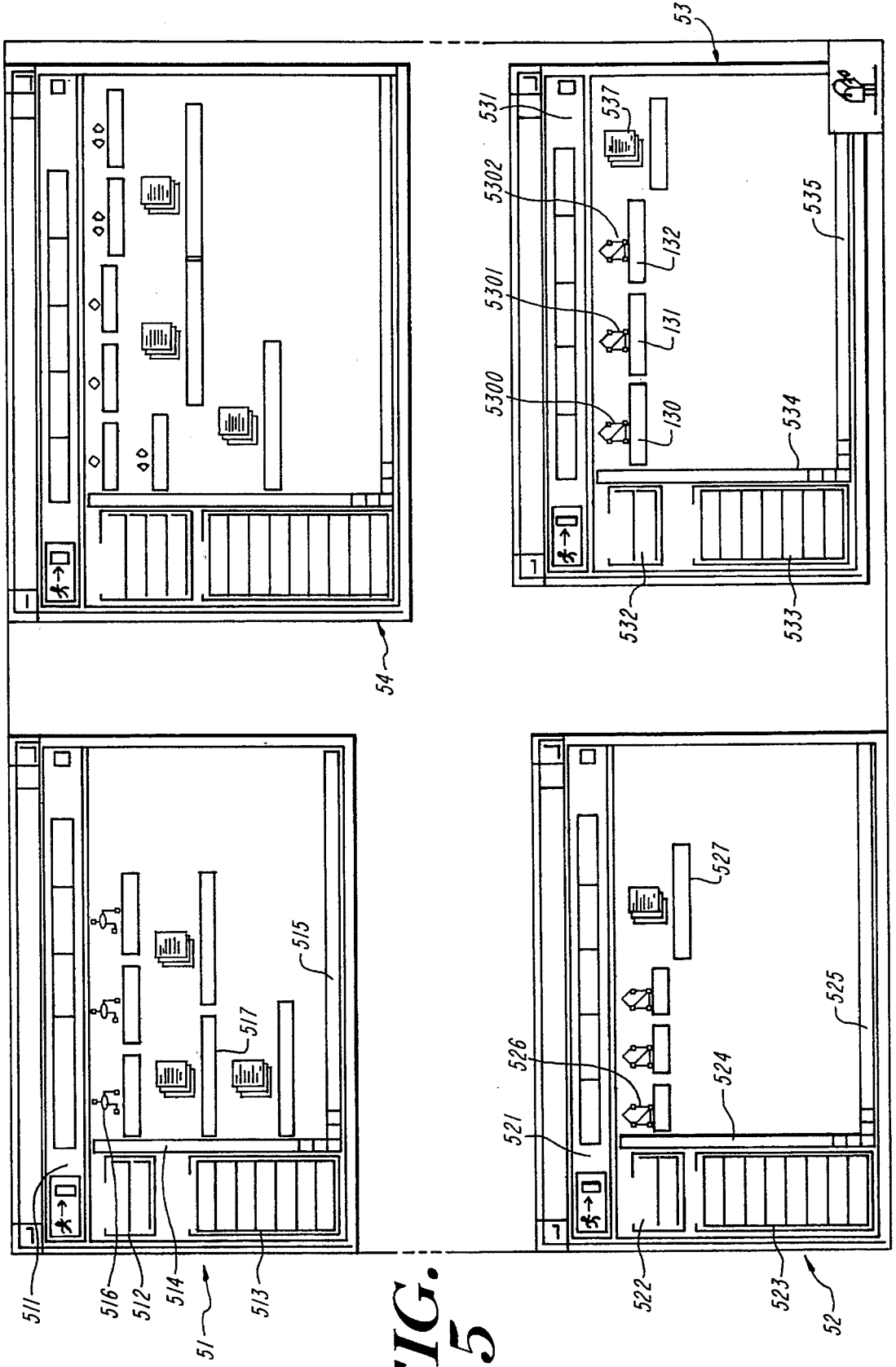

PROCESS AND TOOL FOR CONCEPTUAL MODELING OF EXPERTISE ON A COMPUTER SYSTEM

This application is a National Stage Application, filed under 35 U.S.C. 371, of PCT/FR92/01129. filed Dec. 2, 1992, now WO 93/11497, published Jun. 10, 1993.

FIELD OF THE INVENTION

This invention concerns a process and a tool for conceptual modeling of expertise on a computer system.

BACKGROUND OF THE INVENTION

From European patent 314 594, a conceptual design tool is known that uses a top-down functional approach for the development of the hardware product. This tool includes an inquiry system that enables the user to input each component of a product. Such a system requires a prior description of the components of the product and consequently is frozen for a single application.

Also known from U.S. Pat. No. 4,964,063 is a method of operating a data processing system with conceptual structures that can be used to represent all knowledge that can be represented by elements such as concept data, relational data, functional calculation bits, knowledge representation function bits and symbolic access code bits. The symbolic access code bits represent the storage addresses of the memory means for the attached conceptual data, the relational data and the function code bits.

This method uses the data processing system to link the concept data and the relational data into conceptual graphs which can be shown on the means of display.

This method provides for a breakdown by unit name, slot name, facet name and class or superclass. Such a method, while it permits a description of certain objects of the conceptual model, does not provide a structure of the model that is a guide for gathering and interpreting knowledge, while permitting the search for modularity, reusability and genericity of the elements of the model. The genericity of a model or parts of a model being the property of furnishing a guide to the knowledge-gathering and interpretation process, so that the process is reduced to "instancing" the generic model, namely adding factual information for the field of application to it.

SUMMARY OF THE INVENTION

An initial goal of the invention is achieved by a process for conceptual modeling of expertise on a computer system that has a CPU, a central memory and a display device working in multiwindows graphics mode, with each window equipped with a system of local coordinates and a pointer means in a window, at least one active zone capable of reacting to at least one unit of information constituted by an outside event; said active zone is combined with a group of initial functions called editors that have at least a second reaction function; with activation characterized by the fact that it consists of combining at least one window with a predefined number of conceptual objects constituting a body of knowledge organized on four expertise modeling layers, with each window making it possible to take into account connections between the different conceptual objects, and updating or modifying a conceptual object automatically updates the connections.

According to another special feature, the conceptual objects are composed of relation, function, operator, role, procedure and goal concepts.

According to another special feature, the process includes a step combining a window for creation of a glossary which is then used to define the objects to be described.

According to another special feature, each window has as an active zone a "more" box allowing it to expand the number of fields of information present in the window.

According to another special feature, each window has a display step for the field indicating the connections of an object with the other objects.

According to another special feature, each window has as an active zone a "less" box allowing it to restrict the size of the window and the information displayed in it to the basic information.

According to another special feature, the creation of the glossary includes the following steps:

displaying of a glossary window and a database window arranged in a hierarchy where the knowledge documented and input into memory is displayed, highlighting words of the documented knowledge selected for the glossary in a database window, transferring the word to the glossary by selecting a transfer arrow, and editing connections between the glossary and the documented database.

DESCRIPTION OF THE DRAWINGS

Other characteristics and advantages of the invention will be more readily understood upon reading the description below, with reference to the figures, in which.

DETAILED DESCRIPTION OF THE INVENTION

Figure 1:
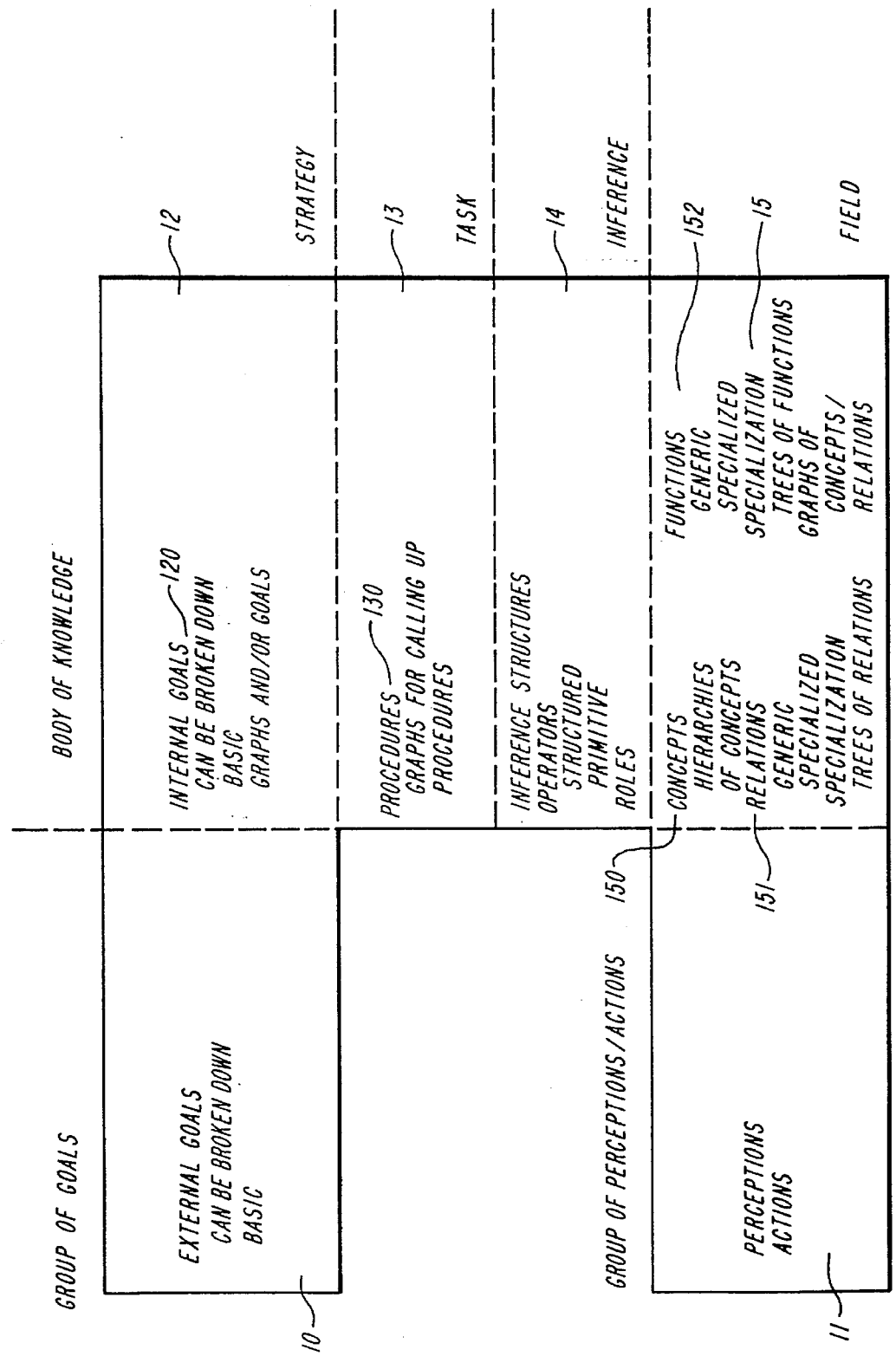
FIG. 1 represents a structure of the expertise model.

Before going on to a detailed description of the process in the invention, we shall specify the computer system on which the invention is used; this system has a central processing unit, a central memory, a display device working in multiwindows graphic mode and a pointer means in a window, at least one active zone capable of reacting to at least one unit of information constituted by an outside event. This means can be advantageously composed, for example, of a mouse whose left button is assigned by convention to selections of graphic object zones on the screen and to calling up the editors of the invention; the right button is assigned to specific operations, such as manipulating certain menus. The outside events coming from the mouse are processed by the preprogrammed mouse interface, which can also recognize the down or up of a button, the drag of the mouse and logic events, such as the entry of the mouse pointer in the window. On the screen, the position of the pointer of the mouse is marked by a small arrow pointing up. Of course, without going beyond the framework of the invention, the mouse could be replaced by any other pointing device, such as an optical pen or a graphics table. The invention also includes a four-level model management program, which makes it possible to create, save, change and print these models in paper format. This software functions in a multiwindows environment and before describing each window associated with an object of the conceptual model, we will describe the structure of the conceptual model, which is composed of a group of goals, a group of perceptions/actions and a body of knowledge, as shown in FIG. 1.

The goal group (10) is composed of outside goals, which are basic goals and goals that can be broken down. The goals describe the operational objectives of the expert task to be automated. They are propositions on the status and the future of the environment in which the rational agent is acting.

The rational agent designates the type of system described in terms of knowledge. The concept model of the expertise describes the three components of a rational agent, which are the group of perceptions/actions, the group of goals and the body of knowledge.

The goals arranged explicitly in this group (10), outside goals as opposed to other goals (inside goals) which are defined directly in the strategy layer of the body of knowledge.

The group of perceptions/actions (11) describes the means of interaction with the environment available for performing the expert task to be automated. The perceptions are characterized by the types of objects perceived, see below. The actions are characterized by the object of the action and by the function which describes the transformation carried out by the action.

The body of knowledge is structured in four layers, a strategy layer (12), a task layer (13), an inference layer (14) and a field layer (15). The field layer (15) contains conceptual objects used to describe the entities in the field of application, the relations and the functions between those entities, as well as their properties. The conceptual objects in the field level are referenced by all the other layers (inference, task, strategy). These objects are the concepts (150), the relations (151) and the functions (152).

A concept (150) describes a concrete or abstract entity class. A concrete entity is directly linked to a perception or action. The list of concrete concepts from the list of perceptions/actions limits the operational range of the expertise to be modeled. The abstract entity is not directly concerned with a perception or action. The abstract concepts come from abstractions produced in the constructive process of interpretation and modeling of the reasoning. The concepts are arranged in a hierarchy of specialization, thus the concept "loss of level" in an application belongs to the "anomaly" hierarchy of specialization for that application.

Appendix 1 contains the different concepts associated with the modeling for an expert system for help in the sale of travel agency products.

A relation (151) is an n-ary predicate. This predicate denotes a relation in the mathematical sense, i.e., a group of n-tuples. The relations cover objects and the relations themselves. (The objects participating in an n-tuple can also be n-tuples.) A relation, for example "Near" (21, Appendix 2), has a list of fields, for example (Trip, Date) which may be named with names that are local in range for the relation and characterized by concepts or relations and potentially a description in the form of a group of clauses. A relation can be specialized. A specialized relation has the same arity and the same numbers of fields as the relation that it specializes (called its generic relation). The types of fields must be specializations (subconcepts or specialized relations) of the types of fields in its generic relation.

Appendix 2 shows the different relations between the concepts in Appendix 1, for example, the relation "compatible," specialized for the concept "product" and the attribute "budget" of the concept "limited." The mechanism of specialization of the relations makes it easier to save names and share properties. Thus, for some applications (shown in FIG. 7), it can be interesting to define a cause-effect relation between instances of "anomaly" which represents a hypothetical or real dysfunction with its characteristics and its temporal occurrence, as a generic relation.

In reality, each subconcept of anomaly (fall, power failure, increase in speed, etc.) can concur with a cause-effect type relation with other subconcepts. In fact, for each pair of anomalies which is in a cause-effect relation, it is necessary to indicate the conditions that cause the relation to be established really. Each of these pairs thus defines a relation which is in fact a specialization of the generic cause-effect relation in the sense that it inherits a certain number of its properties (syntactic, like its name, its arity, the names of the fields and semantic like, for example, the property that in the theory of causality chosen, the cause always temporally precedes the effect). Each specialized relation has a description which takes into account exactly the conditions for establishing such a relation for the anomaly pair in question. This information is documented in the following way.

relation
    name-relation: cause-effect
    fields: [<cause,anomaly>,<effect,anomaly>]
    description: {cause-effect (x,y) ←-precedes(interval(x), interval(y))}
specialized relation
    generic relation: cause-effect
    types-of-fields: [<cause, loading-failure>, <effect, loss-of-level>]
    description: . . . specialized relation
    generic relation: cause-effect
    field: [<cause, fall>, <effect,loss-of-level>]
    description: . . .

Figure 7:
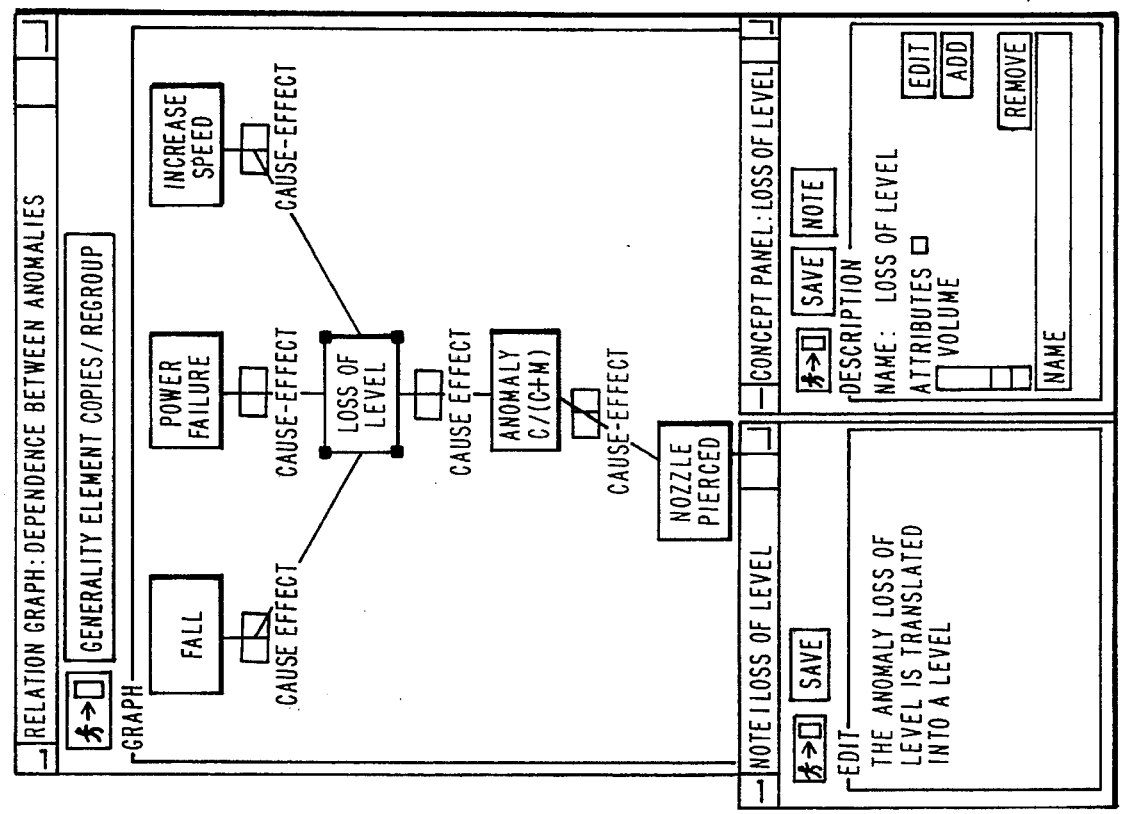
FIG. 7 represents the windows for the graphical representation of the inference strucutres.
Figure 7:
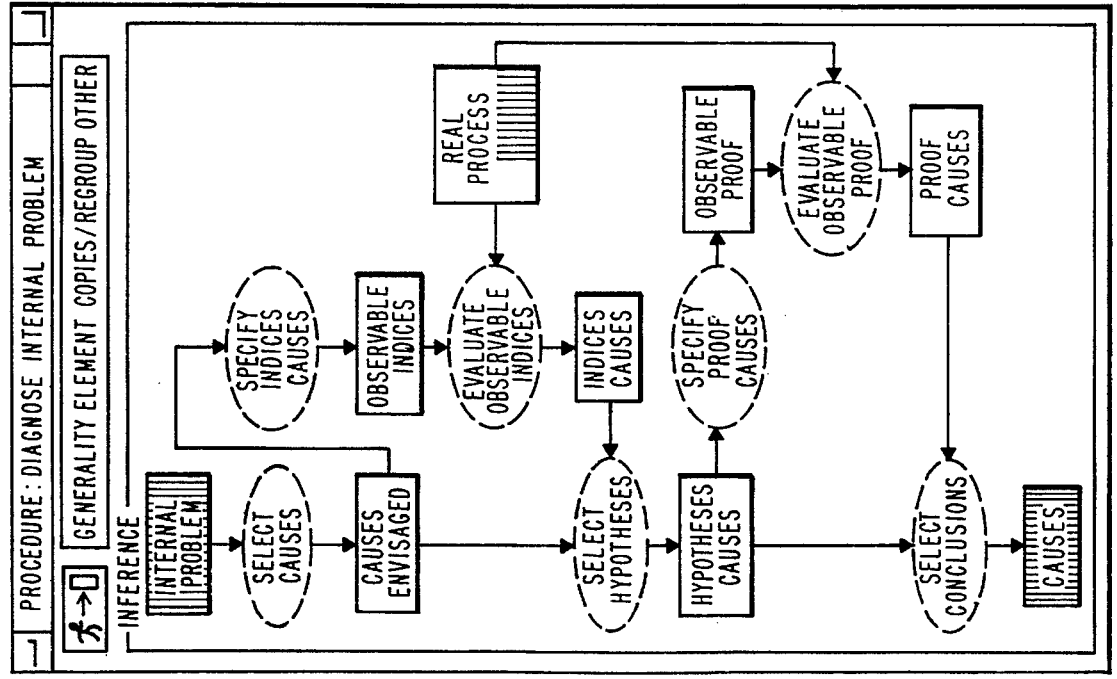

A graph showing the cause-effect relation between functional anomaly of a process is presented in the right window in FIG. 7.

A function (152) is an application in the mathematical sense of the term (particularly, a single image corresponds to each n-tuple of value of the parameters). To each n-ary function corresponds a (n+1)-ary relation (in which the result is the (n+1)-th field. A function can have a relational visibility (the inverse is not true):

$$(x,y,z)(F(x,y)=z <=> F(x,y,z))$$

A function has a list of arguments which may have names that are local in range and types which are concepts and potentially a description by means of a language of functional expressions close to the language currently used in scholarly mathematical texts.

An example of function is shown in Appendix 3 by the reference (1520).

The functions, like the relations, can be specialized. A specialized function inherits the name and the list of arguments of the function that it specializes (its generic function), the types of parameters and the result being subconcepts of the types of its generic function; its description can also be specialized. An example of specialized function is shown below:

specialized function
  generic function: Plus
  types-parameters: <integral, integral>
  type-result: integral
  description: {Plus(x,0)=x, Plus (x,Succ(y))=Succ (Plus(x,y))}

The "Plus" function applied to the integrals has a specialized definition compared to the more generic one defined for the numbers. The description is given in terms of functional equations. It is a constructive definition from the function "Succ" defined elsewhere.

The concepts can be equipped with attributes. An attribute of a concept is nothing more than a unary function whose argument is marked by the concept and the name has a range local to the concept. The attributes are inherited in the specialization hierarchy.

attribute:=name-attribute type-result description name-attribute:=symbol type-result:=concept description:=(a description of the same type as that of the functions.)

The inherited attributes can be specialized in two ways: specialization of the type of result and a new description.

The choice of defining a unary function as an attribute and not as a function is a question of evaluation, knowing that an attribute bears information connected locally with a concept (and with its subconcepts).

The inference layer (14) describes the transformations of the conceptual objects of the field layer dictated by the inference steps and the information flow charts on which these transformations are recorded.

The concept objects of the inference layer are the inference structures, the operators and the roles.

The inference structures describe the flow charts (shown in FIG. 3) of information between operators (301 to 306) and the roles (311 to 318). These inference structures do not convey any information on the sequences of application of the operators, but only highlight the limits imposed by the flow chart. The inference structures have a specific graphic representation. One example is presented in the left window in FIG. 7. The operators (knowledge sources) describe the inference relations between concept instances and relations (an instance of a concept and an instance of a relation, n-ary is an n-tuple belonging to the extension of the relation). An operator "consumes" and "produces" instances of concepts and relations. The operators can be primitive or structured.

A structured operator has a list of operands and a result. The operands and the result are called roles. Its description is given by an inference structure which has the special property that the only node without successors is the result of the structured operator described and the only nodes without predecessors are the operands of the operator. The operators which appear in the inference structure can in turn be primitive or structured.

A primitive operator makes it possible to describe a "basic" transformation that it is no longer interesting to break down by means of an inference structure. The nature of the description of a primitive operator is still a subject of discussion. Specifically the point is to find out whether it is necessary to describe the corresponding inference relation by its abstract properties (the properties of the operands and the result), or in a constructive way, by indicating the calculating mechanisms that do the transformation. These mechanisms can be described either in an algorithmic language or by means of a group of production rules, or in other formalisms.

The roles (38) of the examples of primitive operators explained in Appendix 5 are given in Appendix 4. These roles are the operands and the results of the operators. A role has a name and a list of concepts or relations for the field that play the standard "roles" of the operands and the results of the operators.

The task layer (13) describes a first level of control of the interferences. In fact, the task layer describes the control graph of the primitive operators defined in the inference layer which contains the description of their flow chart.

This control graph is described by means of conceptual objects in the task layer which are the procedures (also called tasks and methods). The procedures are "programs" written in a non-standard imperative/procedural language, which applies the primitive operators defined in the inference layer to the instances of concepts and relations.

Figure 3:
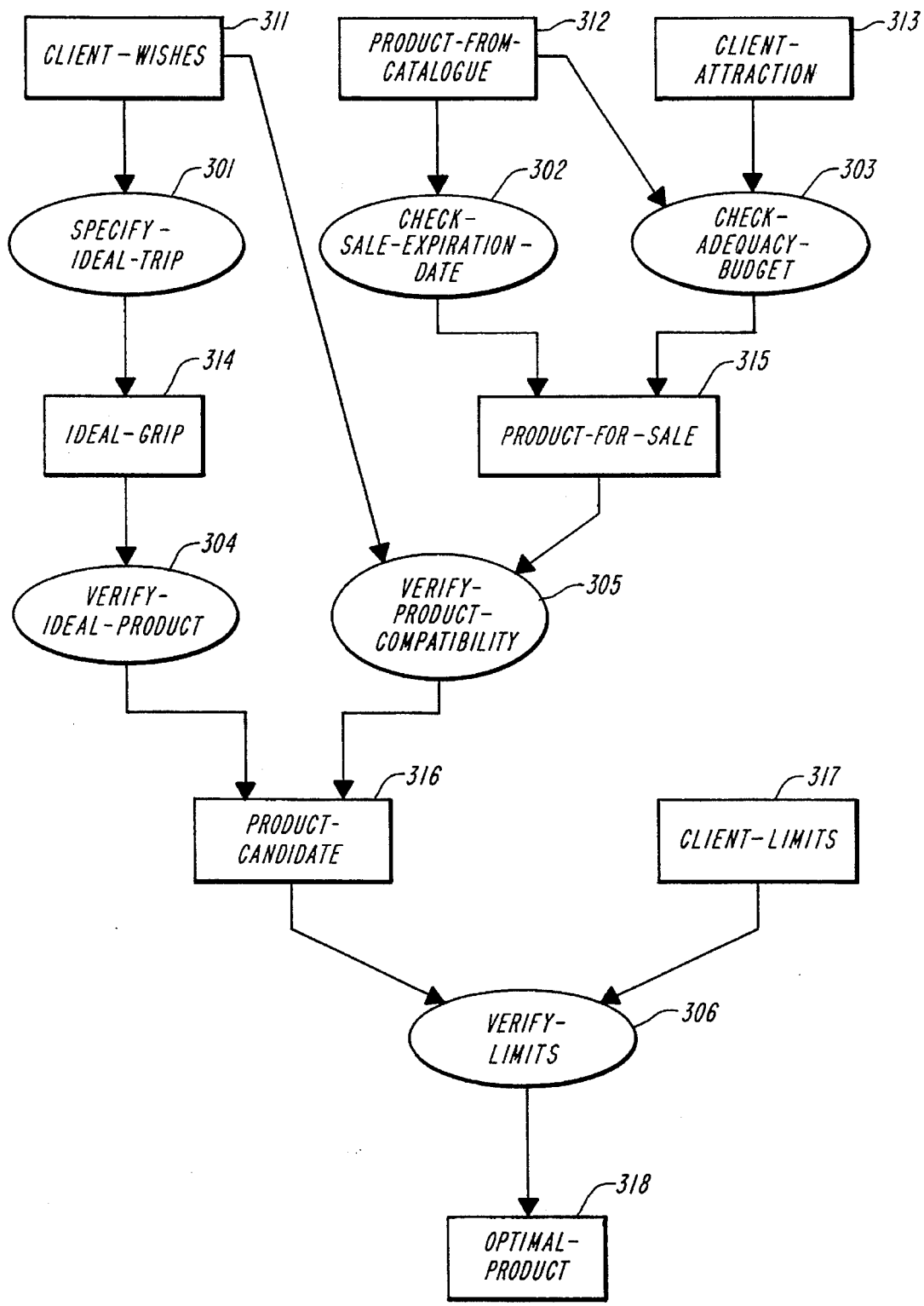
FIG. 3 represents an inference structure.
Figure 5A:
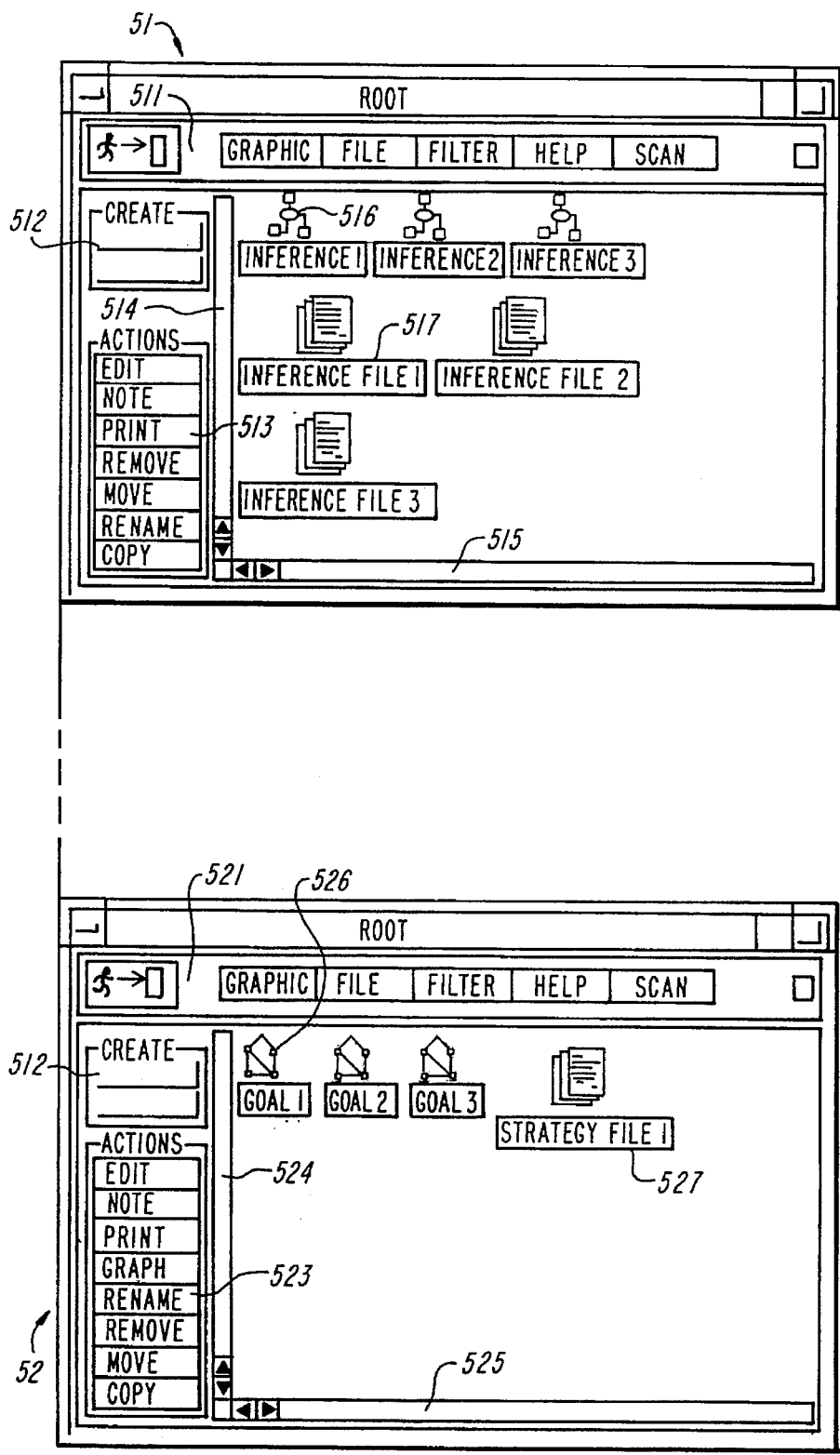
FIG. 5 represents the basic windows for each layer of the body of knowledge.
Figure 5B:
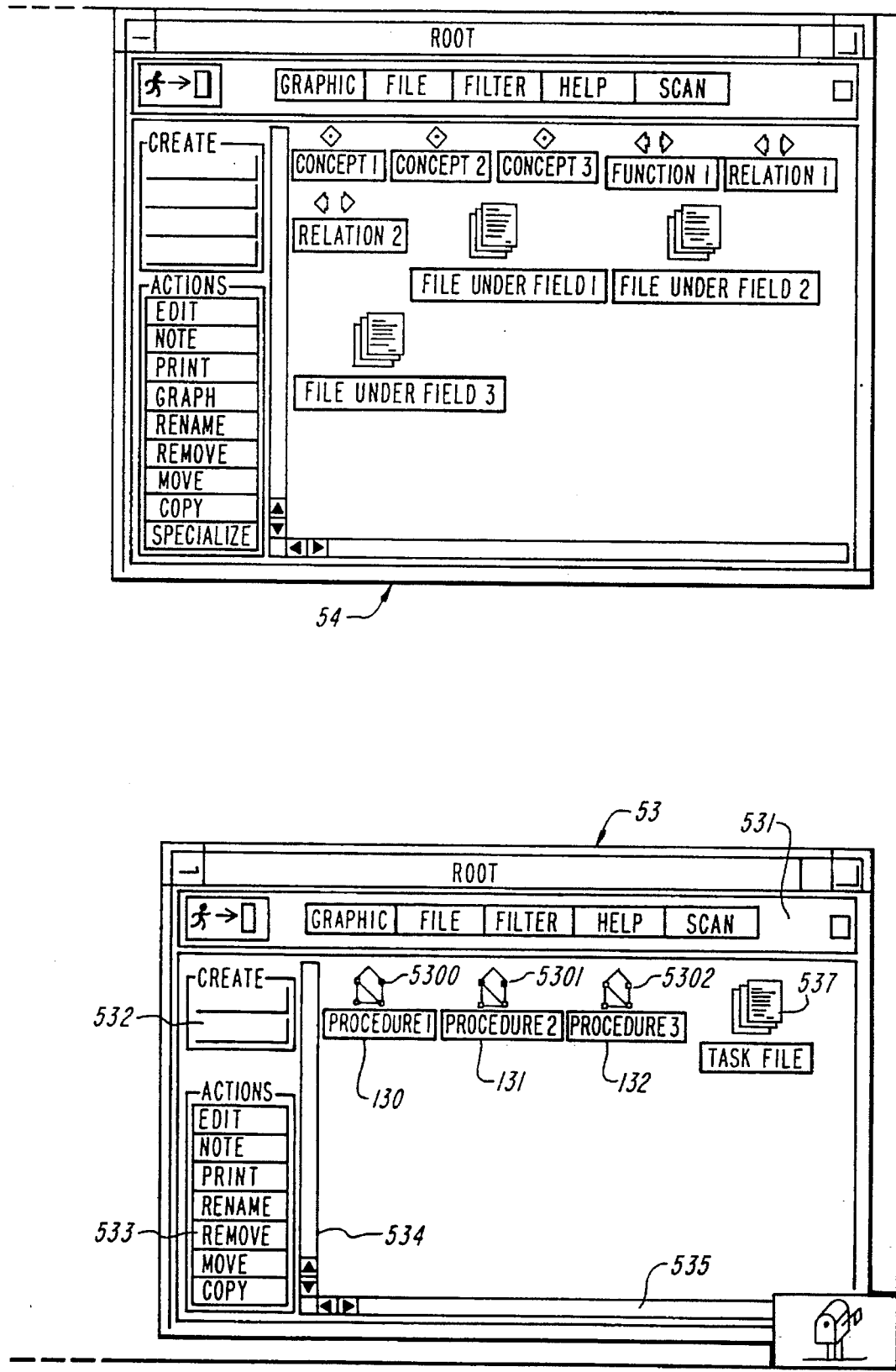

The "present adapted products" procedure in Appendix 6 writes the operators contained in the "determine product" inference structure in FIG. 3 into a control graph which is shown by reference 5301 in the procedure window 53 in FIG. 5.

Most of the models developed today have as their object relatively simple applications, in which a fine description in the strategy layer is redundant. In such cases, one can describe the "general" behavior of the agent in an entirely procedural way. This has caused a resumption of the discussion of the very existence of the strategy layer (12). However, in wide-ranging applications, using several expert "tasks" (monitoring, diagnosis, planning) and the contextual use of knowledge, the strategy layer (12) is a basic component of the expertise model.

Figure 2:
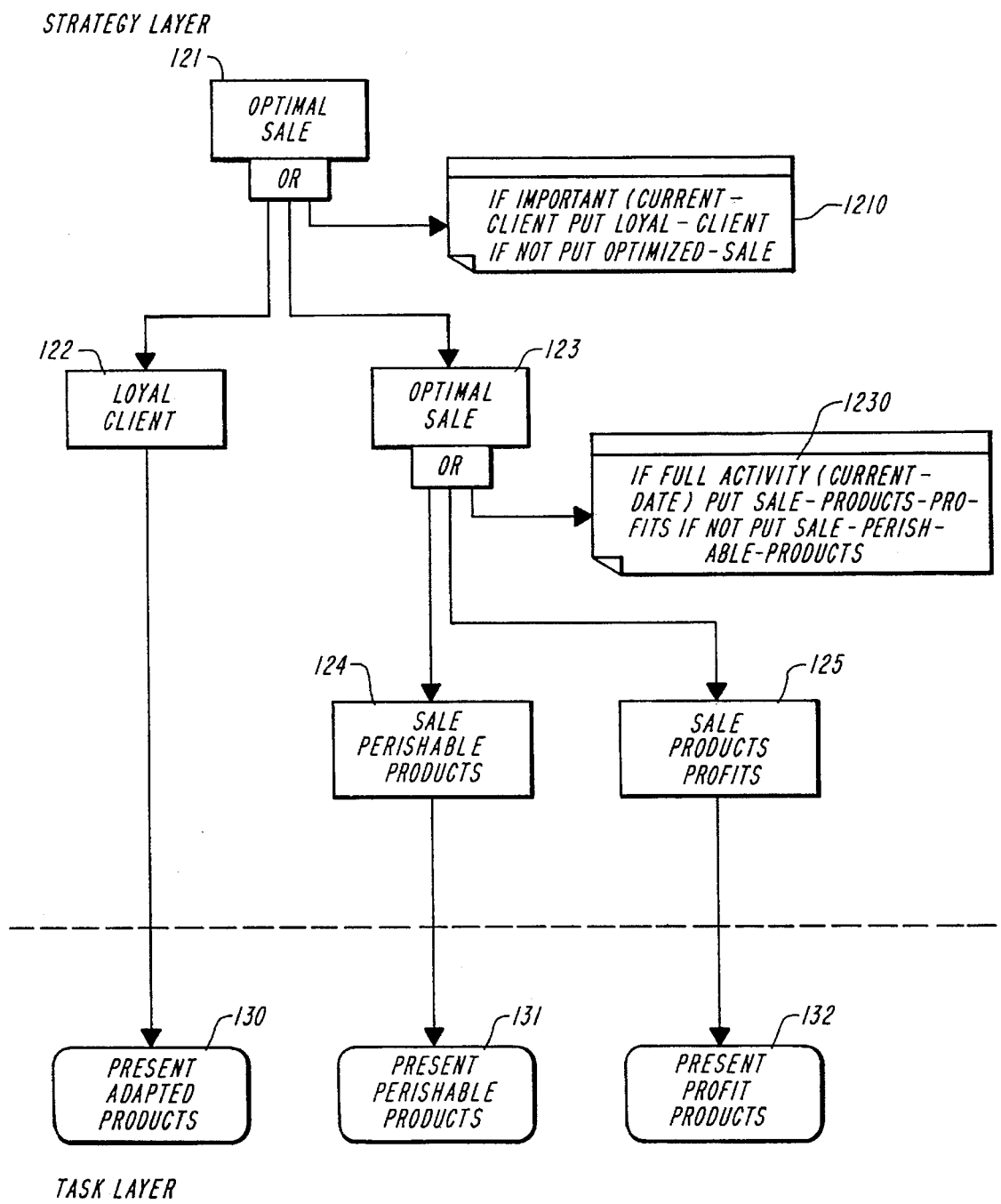
FIG. 2 represents an AND/OR-type graph of the strategy layer and the task layer.

The concept objects of the strategy level are the internal goals (120). The external goals are those which are defined in terms of the overall component of the goals of the rational agent. In the strategy layer, these goals are arranged in a graph (FIG. 2) breaking down the goals. Other goals (the internal goals) come from the breakdown "export" goals into subgoals and are defined directly in the strategy layer of the body of knowledge.

The goals are propositions on the state and the outcome of the environment in which the rational agent evolves The states and the evolution of the environment can and must, for reasons of synthesis and overall visibility, be expressed abstractly (not simply as configurations of values of the perceptions in time). This abstract representation must always be able to be brought back to a concrete representation. From a concrete state, namely a configuration of the values of the perceptions, one must be able to determine in an unambiguous way the corresponding abstract state.

The conceptual objects of the strategy layer (12) (whether external or internal (120)) are distinguished by goals that can be broken down and basic goals.

A goal that can be broken down (121 or 123 in FIG. 2) is an intermediate node of the graph of the goals; it has a type (AND/OR) a list of sub-goals (124, 125) and it can be annotated by a group of optional rules (1210, 1230) between sub-goals (OR goal) or relaxation of sub-goals (AND goal). These rules make it possible to choose the sub-goal to be set (OR node) or the sub-goal not to be set (AND node) contextually to the state of the environment.

A basic goal (122, 124, 125) can no longer be broken down (reasonably) into sub-goals. It can only be reached by executing a procedure (task layer). When several methods can be envisaged to reach a basic goal, the procedures that describe these methods will be attached to this basic goal.

Note that the layers of the body of knowledge maintain relations which have some interesting properties. If they are arranged in a total order (from top to bottom: strategy, task, inference, field), we see that the objects of one layer refer (by name) to the objects of the same layer or lower layers, but never to objects in higher layers. Some interesting properties of a conceptual model can be reduced to properties of the graph of references between conceptual objects.

A conceptual model is down-related if, for each goal, there is at least one path on the graph oriented by references starting from the goal in question and leading to an action. A conceptual model is up-related if for each perception or action there is at least one path on the graph oriented by references starting from a goal and leading to the perception/action in question.

A conceptual model is related if it is down-related and up-related.

A conceptual model is economical if, for each object in the body of knowledge, there is at least one path in the graph not oriented from the references between a goal and a perception/action that goes by the object in question.

The property of connection of a model guarantees that each goal is "processed" and that each perception/action is used. Obviously, it does not guarantee the semantic completeness of the body of knowledge or the pertinence of the references.

The property of economy of a model guarantees the absence of unused conceptual objects. Control of the properties of connection and economy is part of the verification and validation activities. Connection is a measurement of conformity and completeness, while economy is interesting above all in terms of readability and maintainability.

The expertise model structure, as well as the availability of generic conceptual objects, is a guide for gathering and interpreting the expertise. The problem that is raised is how to attack the construction of the model and the structure in layers of the body of knowledge.

From outside to inside (outside-in), the body of knowledge is attacked from the goals and the perceptions/actions. A complete list of the external goals is made, as well as the perceptions/actions which are, a priori, at the disposal of the rational agent. The modeling continues by making a tree of the goals and by defining the internal sub-goals. Along with this, the concrete entities are modeled (objects of the actions and perceptions), as well as the relations and functions in which they appear. The states mentioned in the goal give an initial modeling of the abstract entities. From the tree of goals, outlines of procedures (task layer) are defined and hence operators, which form the elements of the inference layer.

from the inside-out:

This is the so-called approach by models of interpretation. Having quickly identified one or more generic inference structures (diagnosis, planning . . . ), one uses them as a guide to build the inference and task layers. The movement is then up (the strategy layer) and down (the field layer), up to the external goals and the perceptions/actions.

from the top down:

One starts with the goals of the system and goes down through the layers, passing through the tree of sub-goals, the definition of the procedures attached to the basic goals, the definition of the inference structures and the operators and then concepts and relations which mark the goals. This is an approach guided by the processing.

from the bottom up:

One starts from the description of the concepts and relations in the field and one goes up through the layers to the strategy layer. This is an approach guided by the data.

This typology is abstract, in the sense that each of these approaches is literally only one view of the idea. In reality, the step really taken will always be mixed. The outside-in step is adapted above all to new and difficult problems, while the inside-out step (by interpretation models) is adapted to stereotypical problems.

The advantage of the invention is to allow the adoption of any step and to change the step during the description of the model.

This is permitted by a multiwindows environment, with direct manipulation on the graphic work station. The invention has tools for helping organize the encyclopedia of expertise and the construction of the conceptual model.

Thus the software offers the possibility of manipulating the objects of the expertise model with tools that help edit, organize, consult and manage.

A first family with a group of graphics editors makes it possible to display a window for each conceptual object per se in the different layers of the model; the window facilitates and guides the acquisition of the properties of the object and the connections authorized between that object and the other objects of the same layer or other layers. Thus, a first window (30) makes-it possible to describe the functions (152) which belong to the field (15). This window (30) displays on the menu band the name of the function which is entered in a first active zone (301) entitled "Name." A second active zone (302) of this window (30) has an ascender (3020) which makes it possible, when this zone is filled, to select one of the parameters in this second zone (302), for example, with the help of the "remove" box (3021) to eliminate the parameter selected, or with the help of the "add" box (3022), to add a parameter at the place pointed. A third active zone (303) "result" enables the operator to write the result corresponding to the function that he is in the process of specifying. Thus, if one refers to the function "length" (152) in Appendix 3, this box (303) will have the information "integer." Then a last active zone (304) "description" allows the user to enter the description of the function on the keyboard. A "cancel" box (305) makes it possible, when activated, to cancel the operation carried out in the window (30), an "update" box (306) when activated makes it possible to update the contents of the memory on the basis of information entered from the keyboard in the different active zones and to edit the connections between the different objects of the model, displaying in the other objects the connections that the object described can have to the objects already described. A "more" box (307) makes it possible to expand the display in the window to other additional information, as we shall see below in connection with the relation window. Finally, the boxes (309) have "guide," "library" and "quit function editor" (30) functions.

Figure 4:
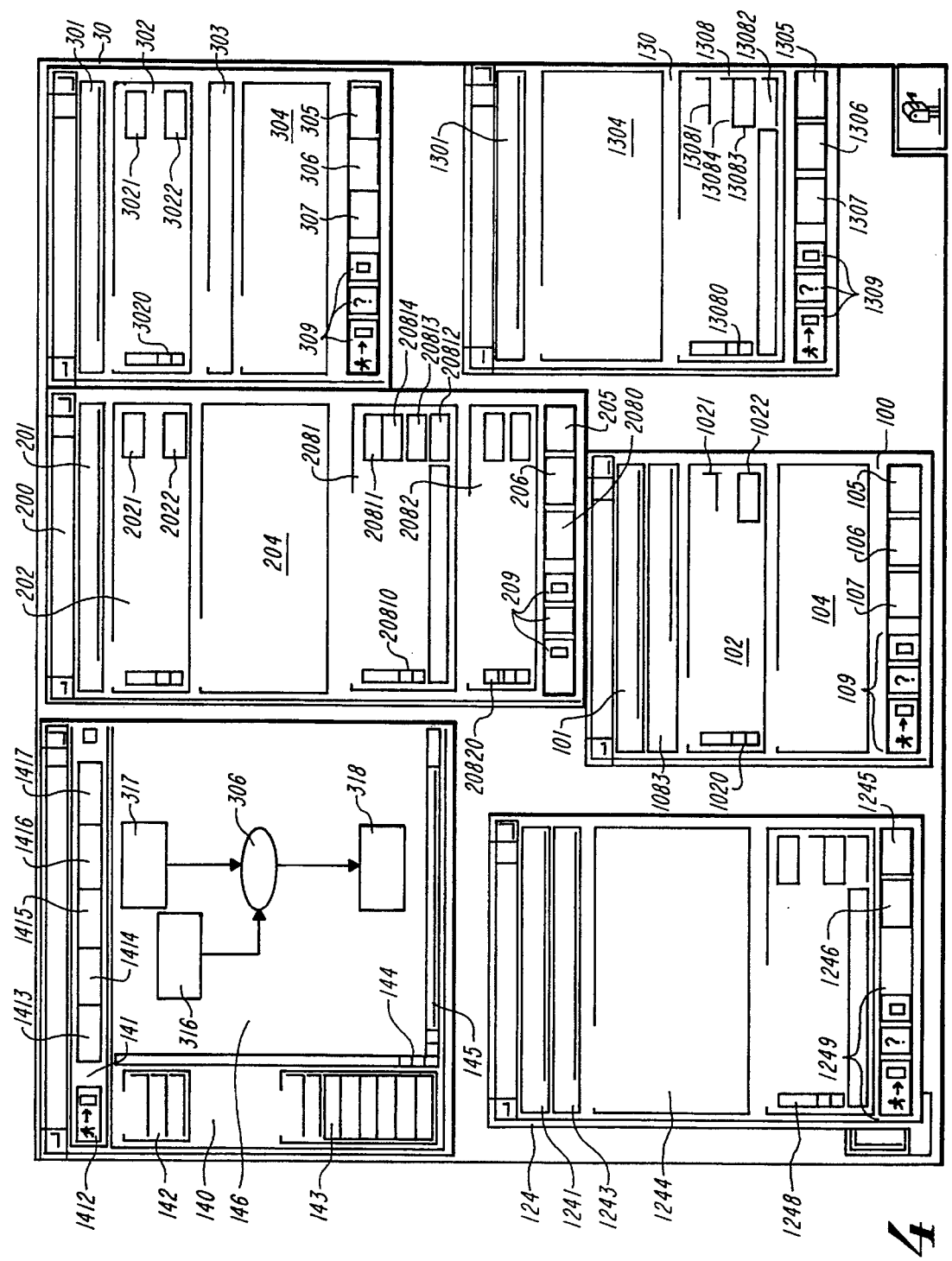
FIG. 4 represents the different windows manipulated by the system and associated with each object editor.
Figure 4A:
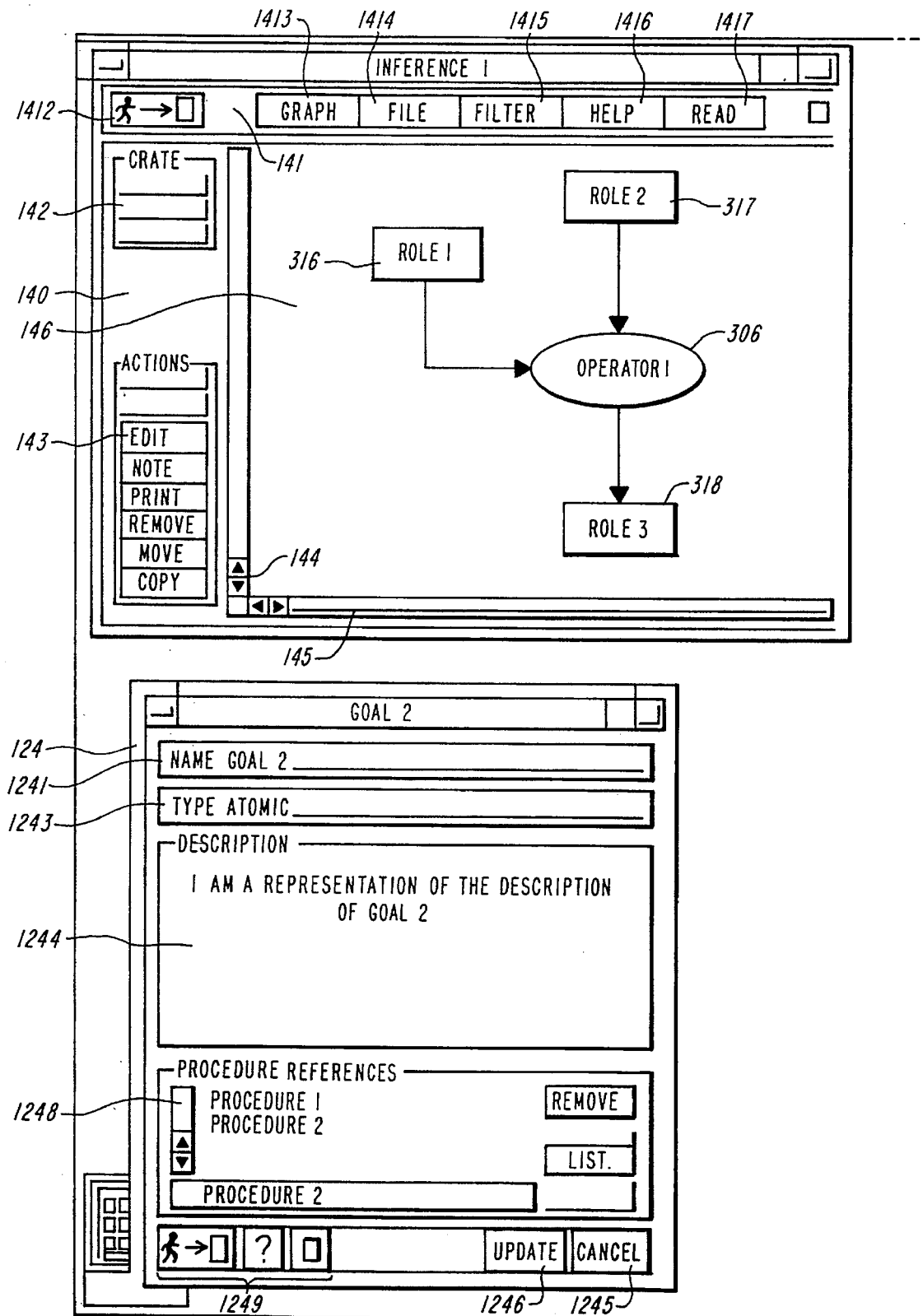
Figure 4B:
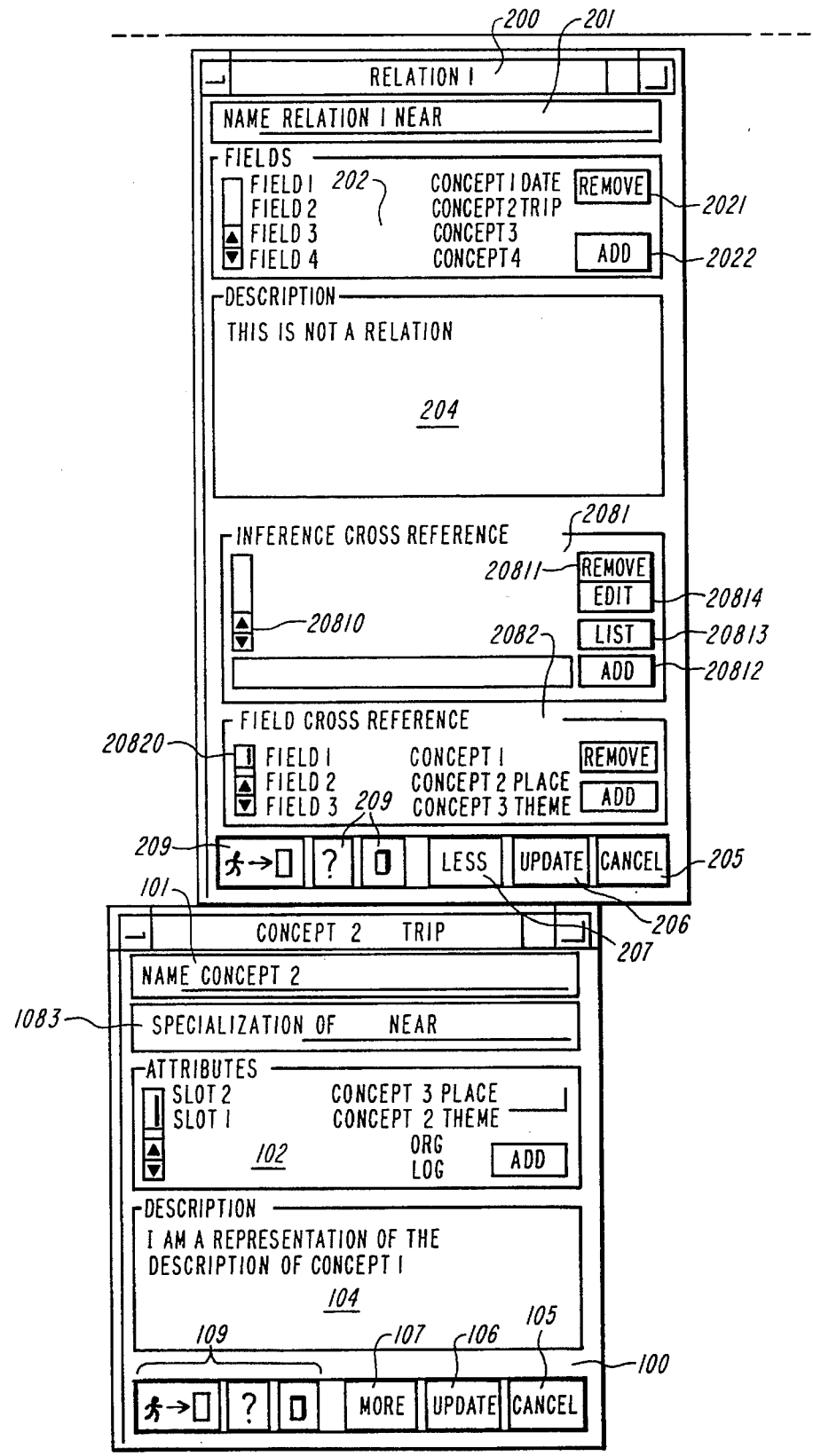
Figure 4C:
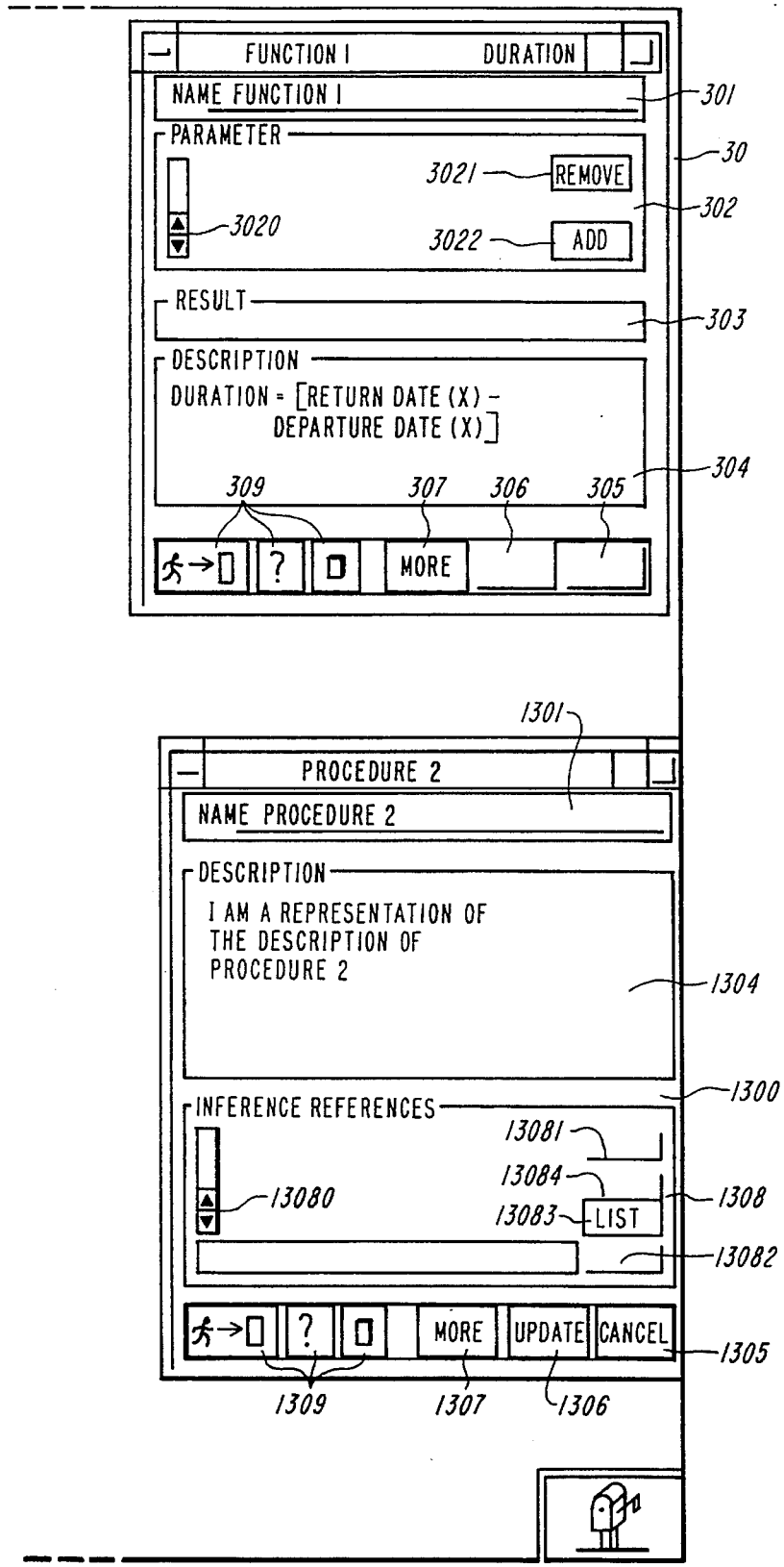

A second window (200) makes it possible to edit the relations (151) in the field layer (15). This window includes active zones (201, 202, 204) identical to the active zones (301, 302, 304) in the function window. The active zone (202) makes it possible to describe the fields of each relation and to design the concepts attached to these fields. The window has in its active zone (201) the name of the "near" relation (21, Appendix 2) which is made up of the "date" (16, Appendix 1) and the "trip" (11, Appendix 1) fields, which are concepts that will be described each in a respective concept editing window (100). Similarly, an active box (205) makes it possible to cancel what has been written in the active zones of the window (200); the box (206) makes it possible to update the contents of the memory and the connections between the different objects in the different layers; the "less" box (2080) makes it possible to reduce the window to the minimum size constituted by the display of the active zones "menu" (200), "name" (201), "field" (202) and "description" (204). In the illustrated expanded display of window (200), commanded by activating a "more" button from a contracted display of the window (200) (not illustrated), the relation window (200) as shown in FIG. 4, has an active zone (2081) that includes cross references to the inferences. The contracted display is commanded by activation of the "less" button (2080). An ascender (20810) makes it possible in this "references crossed with inferences" (2081) active zone to select a location; and "remove" (20811) and "add" (20812) boxes make it possible respectively to remove or add cross references to inferences. A "list" box (20813) makes it possible to list and display the inferences of the model; an "edit" box (20814) makes it possible to edit the inference selected by the ascender (20810) and thus go directly to the display of a window (140), making it possible to edit the inference selected in the active zone of the "inference cross references" helping describe the relation being displayed. Similarly, an additional active zone (2082) makes it possible to design the cross references to the fields and to indicate at the places selected by the ascender (20820) the concept to be added or removed from this description. Thus, this active zone (2082) makes it possible to establish connections between the relation and the concepts in the field, while the preceding active zone (2081) makes it possible to establish connections with the inference structures of the inference layer. Here again, in this window describing a relation of the model, the addition or removal of an inference or of a field, after selecting the "update" box (206), starts an automatic update of the connections which can appear in the inferences or the fields connected to that relation.

A third type of window (100) makes it possible to edit the concepts in the field. This third type of window (100) is composed in the same way as the function (30) and relation (200) windows, of three active zones; a first zone (101) making it possible to write in the name of the concept; a second (102) making it possible to define the attributes to be added or removed from the concept; and a third (104) to define the description of the concept. Like the "field" (202) and "parameter" (502) zones, the active zone "attributes" (102) has an ascender (1020) and the "remove" (1021) and "add" (1022) boxes. The activation boxes (105, 106, 107) have functions identical to the functions of the activation boxes (305 to 307) and the boxes (109) of the functions identical to the activation boxes (209,309).

A fourth type of window (130) makes possible a description of the procedures in the task layer. Like the preceding windows, this window has active zones (1301) for defining the name of the procedure, (1304) describing the procedure, (1305) canceling the information entered, (1306) updating data and connections associated with the procedure, (1307) enlarging information displayed by the window and boxes (1309) making it possible to display the "guide" function, the library or to quit this editor. In addition, this procedure window (130) has an active zone (1308) which makes it possible to display the references of the inferences to which these procedures refer and with the "edit" function (13084) to edit the corresponding inference graph. As in the active zone (2081) of the relation window, this active zone also has an activation box "remove" (13081) to remove a reference to an inference and a "list" box (13083) to list the inferences and (13082) to add an inference at the position indicated by the up arrow (13080).

Similarly, the fifth goal window (124) has the active zones (1241) to show the name of the goal, (1244) to describe the goal, (1243) to designate the type of goal and (1248) to designate the procedures with which this goal can be associated. The active zone (1248) is the same type as the active zone (1308) of the procedure window (130). Similarly, this goal window has the cancel (1245) and update (1246) boxes and the boxes (1249) for the same functions as the boxes (309).

A sixth inference-editing window (140) has a menu bar (141) making it possible with an activate box (1412) to quit the editor, with an activatable "graph" box (1413) to create a graph, with a "file" box (1414) to display the inference files, with a "filter" box (1415) to filter . . . , with a "help" box (1416) to guide the user and with a "read" box (1417) to scan the inference. This window has a second active zone (142) which has a creation box which makes it possible to create a new inference graph and a third active zone action (143) which includes the classic editing, printing, move, remove and copy boxes, as well as a note box for putting notes with an operator or a role.

Ascenders (144, 145) allow moving and/or enlarging the main window (146). The graph created for the inference considered appears in the window (146). Thus, if we take the inference graph shown in FIG. 3, the window (146) can correspond to the description of the operator (306) "to check the limits," role 1 (316) to the "product-candidate" concept, role 2 "client-limit" (317), which is the "limit" type of concept, and role 3 "optimal product" (318), which is the "product" type of concept.

The zones (141, 142, 143, 144, 145) of the inference window are the same type as the zones of the root windows (51 to 54) which make it possible to define the inference graphs (5188) for each of the inferences which make it possible to define the graphs of goals (526), for each of the goals defined for the model, the procedure graphs (5300) for the procedure root window (53) and the fields for the window (54).

These windows also make it possible to display and call up the strategy files in the root window goals (52). The inference files (517) in the root window inference (51), like the root window procedure (53), which makes it possible to define the graphs for calling up the procedure (5300) for procedure 1, (5301) for procedure 2, (5302) for procedure 3. A last root window (54) makes it possible to assemble in its central zone (546) and to display the different objects "concepts," "function," "relation" which constitute the field of expertise as well as the different files in the field. This window also has different activation zones that let you either trace graphs, or edit, or print or create new objects that go in the field.

Figure 6:
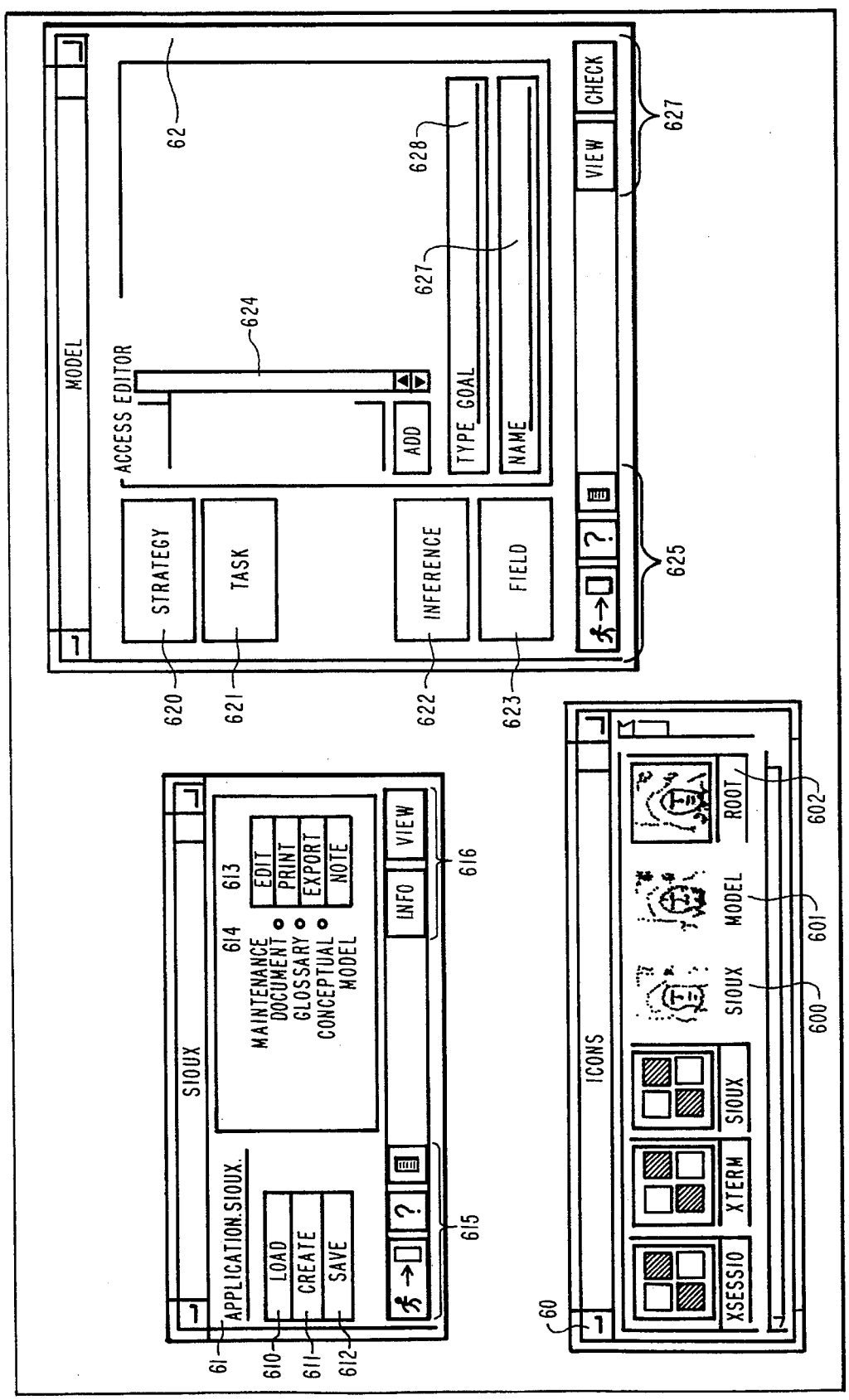
FIG. 6 represents the windows for accessing each of the functions of the software or the conceptual model.

Finally, at start-up, the software has a display of the icon (60) shown in FIG. 6 which makes it possible to call up with icon (600) the window (61), with the icon (601) the "model" window (62) and with the icon (602) the windows appearing in FIGS. 5. The input window (61) in the software lets you use the boxes load (610), create (611) and save (612) to define the operation to be carried out and radio buttons (614) to define the object on which the operation will be carried out if it is a glossary, a conceptual model or maintenance documents to form the expertise model. The edit, print, export and note boxes (613) make it possible to carry out the operations above on one of the objects in the window.

Lastly, this window is supplemented by boxes (615) which have the same functions as the boxes (309), and by the boxes (616) which make it possible to obtain information or a display of the elements designated by the radio buttons. The model window (62) has four boxes each associated with a layer of the model, (620) for strategy, (621) for the task, (622) for the inference, (623) for the field and which make it possible to access one of these layers in the expertise model.

An active zone (628) makes it possible to define the type of object editor that the operator calls up in the window in the layer defined by the boxes (620 to 623), the zone (627) defines the name of the object and the up cursor (624) makes it possible to define the place where the object will be added. Lastly, the boxes (625 and 626) have functions identical to boxes (615, 616).

The glossary function shown in the window (61) makes it possible, after having loaded a maintenance document by selecting the first radio button (maintenance document) and after selecting the active zone "load" (610), to select with the second radio button the window (61) of the "glossary" function and to activate the create box (611). This latter operation makes a "glossary" window appear, while the first makes a second window appear in which the maintenance document appears. The mouse or any other means makes it possible to move a cursor which highlights the word you want to select. An active "export" zone in the "maintenance document" window makes it possible to transfer the word selected into the glossary window. This word then appears in the glossary window, at the place designated by the cursor of the up arrow. In this way, the software associated with the system makes it possible to define the glossaries necessary for defining the conceptual model and then define the model.

At the time of the model definition steps or at each update of the model, when the operator introduces a new object, for example a new role in an inference graph, after the operator has confirmed the operation on the inference graph, the software goes to look in the files for the different objects depending on the inference graph and the new role defined in the references and stores them in this subdivision of the memory, which is used for this storage. Subsequently, when a window of an object connected with an object that has just been added is called up, the display will directly display the connection with the new object added. For example, if you create a relation and specify the type of fields by concepts, if the relative concept window is displayed, the relation appears automatically in the cross referenced zone of that window. The family of functions performed by the software that was just described makes it possible to manage the plotting connections by storing and going through the existing connections in the conceptual models. The objects of the model are arranged in modules. To reference objects of another module inside a module, it is necessary to import the module in question.

APPENDIX 1

Field Layer

<u>Concepts</u> concept:   Date                           16 concept:   Integer concept:   Client                                    313
  attribute:  [<attraction,attraction>]

constant:  Easy
  type:   Attraction constant:  Modest
  type:   Attraction concept:   Comfort concept:   Luxurious
  type:   Comfort constant:  Comfortable
  type:   Comfort concept:   Theme constant:  Adventure
  type:   Theme constant:  Sport                                      14
  type:   Theme constant:  Cultural
  type:   Theme constant:  Cross
  type:   Theme

APPENDIX 1 (cont. 1)

```
concept:  Organization constant: Individual                    15
  type:   Organization constant: Collective
  type:   Organization constant: Threshold-trip-near
  type:   Integer constant: Threshold-deviation-budget
  type:   Integer constant: Threshold-small-budgets
  type:   Integer constant: Threshold-large-budgets
  type:   Integer concept:  Period concept:  Product
  attributes:
  [<Trip,Trip>                          312
   <Price,Integer>,
   <Quantity,Integer>]
```

APPENDIX 1 (cont. 2)

```
concept: Desires                                311
 attributes:
     [<Place,Place>,
      <Climate,Climate>,
      <Comfort,Comfort>,
      <Theme,Theme>,
      <Organization,Organization>]

concept:  Limits
 attributes:
     [<Length,Integer>,
      <Departure Date,Date>,
      <Return Date,Date>,
      <Budget,Integer>,
      <Number of participants, Integer>]

concept: Trip
 attributes:
     [<Place,Place> - 12
      <Theme,Theme>, - 14
      <Organization,Organization>, -15          11
      <Departure Date,Date>,
      <Return Date,Date>
      <Lodging, Lodging>] - 13 concept:  Place
 attributes: [<Climate,Climate>]                12 concept:  Lodging
 attributes: [<Comfort,Comfort>]                13 concept:  Climate constant: Current Date
 type:  Date
```

APPENDIX 2

Relations relation: Important
 field: [<Client>]

relation:Activity-full
 field:[<,Period>]

relation:Near
 field:[<,Trip>,<,Date>]
description:
    {[Near(x,y)<-
      (y - Departure Date(x)) <Threshold-trip-near]}    21 relation:compatible
 field: [<,Product>,<,Budget>]
 description:
    {[Compatible(x,y) <-
        Module(Price(x) - y) < Threshold-deviation-budget]}

APPENDIX 3

Functions

```
function:Duration
 arguments:[<,Trip>]
 result:Integer                                                    1520
 description:
  {[Duration(x) = return date(x) - departure date(x)]}
```

APPENDIX 4

<u>Roles</u> role:Client-wishes
  type: wishes     311 role:Client-limits
  type:limits     317 role:Product-from-catalogue
  type:Product     312 role:Client-current
  type:Client role:Product-candidate
  type:Product     316 role:Optimal-Product
  type:Product     318 role:Ideal-Trip
  type:Trip     314 role:Product-to-sell
  type:Product     317

APPENDIX 5

Operators

```
operator-primitive:Check-limits
 operands:
     [Product-candidate,
     Client-limits]
 result:Optimal-product
 description
     {[departure date(Trip(Product-candidate)) =
      Departure date(Client-limits) =
      Departure date(Trip(Optimal-product))],
     [Return date(Trip(Product-candidate)) =
      Return date(Client-limits)=                                    306
      Return date(Trip(Optimal-product))],
     [Price(Product-candidate) =
      Budget(Client-limits) =
      Price(Optimal-product)],
     [Duration(Client-limits) =
      Duration(Trip(Product-candidate)) =
      Duration(Trip(Optimal-product))],
     [Quantity(Product-candidate) =
      Quantity(Optimal-product) = <
      Number-of-participants(Client-limits)]} operator-primitive: Specify-ideal-trip
 operands: Client-wishes
 result: Ideal-trip
 description:
 {[Place(Wish) = Place(Ideal-trip)],
  [Climate(Client-wishes) = Climate(Place(Ideal-trip))]
  [Comfort(Client-wishes) =                                          301
     Comfort(Lodging(Ideal-trip))],
  [Theme(Client-wishes) = Theme(Ideal-trip)]
  [Organization(Client-wishes) =
     Organization(Ideal-trip)]}
```

APPENDIX 5 (cont. 1)

```
operator primitive:Verify-ideal-product
 operands:
     [Product-from-catalogue,
     Ideal-trip]
 result:Product-candidate
 description:
     {[Place(Trip-Product-from-catalogue)) =
      Place(Trip(Product-candidate)) =
      Place(Ideal-trip)],
     [Theme(Trip(Product-from-catalogue)) =
      Theme(Trip(Product-candidate)) =                              304
      Theme(Ideal-trip)],
     [Organization(Trip(Product-from-catalogue)) =
      Organization(Trip(Product-candidate)) =
      Organization(Ideal-trip)],
     [Lodging(Trip(Product-from-catalogue)) =
      Lodging(Trip(Ideal-product)) =
      Lodging(Ideal-trip)]} operator primitive: Verify-product-compatibility
 operands:
     [Product-for-sale,
     Client-wishes]
 result: Product-candidate
 description:
     {[Place(Trip(Product-for-sale)) =
       Place(Client-wishes) =
       Place(Trip(Product-candidate))],
     [Climate(Place(Trip(Product-for-sale))) =
       Climate(Client-wishes) =
       Climate(Place(Trip(Product-candidate)))],
     [Theme(Trip(Product-for-sale)) =
      Theme(Client-wishes) =
      Theme(Trip(Product-candidate))],
     [Organization(Trip(Product-for-sale)) =                        305
      Organization(Client-wishes) =
      Organization(Trip(Product-candidate))],
     [Comfort(Lodging(Trip(Product-for-sale))) =
      Comfort(Client-wishes) =
      Comfort(Lodging(Trip(Product-candidate)))]}
```

APPENDIX 5 (cont. 2)

```
operator primitive:Verify-adequacy-budget
     operands:
          [Product-from-catalogue,
          Current-client]
result:Product-to-sell
     description:                                                     303
       {[Price(Product-for-sale) = Price(Product-from-catalogue)],
        [Attraction(Current-client) ->
         Compatible(Product-for-sale,Threshold-large-budget)]
        [Not(Attraction(Current-client)) ->
         Compatible(Product-to-sell, Threshold-small-budget)]} operator primitive:Verify-sale-deadline
 operands:Product-from-catalogue
 result:Product-candidate                                             302
 description:
      {[Near(Product-from-catalogue,Current-date),
        Near(Product-candidate,Current-date)]}
```

APPENDIX 6

Task layer

```
task:Present-adapted-products
 methods:
    [optimal-products:=
    Calculate-adapted-products
        (Current-client,
         Product-catalogue),
    Present(Optimal-products)]

method:Calculate-adapted-products
 arguments: [client,products]
 body:
    [START
        ideal:= specify-ideal-trip(Client(wishes)),
        SO LONG AS prod IN products                     130
        prod 1:=Check-ideal-product(idea,prod),
        prod 2:=Check-limits
    (prod1,Client(limits)),
        optimal=Add(prod2)
        END SO LONG AS
    END optimal]

task:Present-perishable-products
 methods:
    [perishable-products:=
      Calculate-perishable-products
          (Catalogue-products,
           Current date,
           Current client)
      Present(perishable-products)]

method:Calculate-perishable-products
 parameters:
    [products,current-date,client]
 body:
    [START
        SO LONG AS product IN products
            prod:=Check-sale-expiration-date           131
                (current-date,product),
            prod1:Check-compatibility-product
                (wishes(client),prod),
            choose:=Add(prod1),
            END SO LONG AS
    END choose]
```

APPENDIX 6 (cont. 1)

```
task:Present-products-profits
 methods:
     [expensive-products:=
       Calculate-products-profits
           (catalogue-products,
           Current-client),
      Present(expensive-products)]

method:calculate-products-profits
 parameters:[products,client]
 body:
     [START
         SO LONG AS product IN products
           prod:=Check-adequacy-budget
               (product,client),
           prod1:=Check-compatibility-product
               (product,Wishes(client)),
          Choose:=Add(prod1)
          END SO LONG AS
     END choose]
```

What is claimed is:

1. A conceptual expertise modeling system on a computer system having a central processing unit, a central memory and a display device working in a multi-windows graphics mode, the modeling system comprising:

a plurality of windows, each window of the modeling system equipped with a system of local coordinates and with a means of marking in said each window at least one active zone capable of reacting to at least one unit of information constituted by an outside event, said active zone being associated with a group of initial editor functions that have at least one secondary reaction function; and a predefined number of conceptual objects making up a body of knowledge organized on four expertise modeling layers and displayed in said plurality of windows, each of said windows enabling the display, editing and saving of connections between ones of said conceptual objects, and each window enabling an update of the connections between the conceptual objects upon an update or change in a conceptual object, wherein the four expertise modeling layers are constituted by a strategy layer, a task layer, an inference layer, and a field layer, wherein the conceptual objects of the strategy layer are internal aims, wherein the conceptual objects of the task layer are procedures, wherein the conceptual objects of the inference layer are inference structures, operators and catalogues, wherein the conceptual objects of the field layer are concepts relations, and functions, and a first window, a second window, and a third window permit respectively the description of the functions, the relations and the concepts which belong to the field layer.

2. The modeling system according to claim 1 wherein the second window contains references linked with the inference structures.

3. The modeling system according to claim 1 wherein the second window contains a supplementary active zone containing links between the relations and the field concepts.

4. The modeling system according to claim 1 wherein a fourth type of window permits description of the procedures of the task layer.

5. The modeling system according to claim 1 wherein a fifth type of window permits description of the internal aims.

6. The modeling system according to claim 2 wherein a sixth type of window permits the description of the inference structures.

* * * * *